United States Patent
D'Souza et al.

(10) Patent No.: US 9,616,414 B2
(45) Date of Patent: Apr. 11, 2017

(54) ALKALINE EARTH METAL/METAL OXIDE SUPPORTED CATALYSTS

(71) Applicant: SABIC Global Technologies B.V., Amsterdam (NL)

(72) Inventors: Lawrence D'Souza, Thuwal (SA); Vinu Viswanath, Thuwal (SA)

(73) Assignee: SABIC Global Technologies B.V., Amsterdam (NL)

( * ) Notice: Subject to any disclaimer, the term of this patent is extended or adjusted under 35 U.S.C. 154(b) by 0 days.

(21) Appl. No.: 14/273,256

(22) Filed: May 8, 2014

(65) Prior Publication Data

US 2014/0332726 A1 Nov. 13, 2014

Related U.S. Application Data

(60) Provisional application No. 61/845,110, filed on Jul. 11, 2013, provisional application No. 61/821,522, filed on May 9, 2013.

(51) Int. Cl.
  *B01J 23/89* (2006.01)
  *B01J 23/83* (2006.01)
  (Continued)

(52) U.S. Cl.
  CPC ......... *B01J 23/8946* (2013.01); *B01J 21/005* (2013.01); *B01J 23/002* (2013.01);
  (Continued)

(58) Field of Classification Search
  CPC .............. B01J 37/04; B01J 21/16; C01B 3/26
  See application file for complete search history.

(56) References Cited

U.S. PATENT DOCUMENTS 3,650,713 A  3/1972 Chinchen et al. ........... 48/198.7
4,060,498 A * 11/1977 Kawagoshi ............ B01J 23/894
                                                         252/373

(Continued)

FOREIGN PATENT DOCUMENTS

CN       101279271 A     10/2008
CN       101637726 A      2/2010
(Continued)

OTHER PUBLICATIONS

IUPAC. Compendium of Chemical Terminology, 2nd ed. (the "Gold Book"). Compiled by A. D. McNaught and A. Wilkinson. Blackwell Scientific Publication Oxford (1997).*

(Continued)

*Primary Examiner* — Paul Wartalowicz
(74) *Attorney, Agent, or Firm* — Norton Rose Fulbright US LLP (57) ABSTRACT

Disclosed is a hydrocarbon gas reforming supported catalyst, and methods for its use, that includes a catalytic material capable of catalyzing the production of a gaseous mixture comprising hydrogen and carbon monoxide from a hydrocarbon gas, and a support material comprising an alkaline earth metal/metal oxide compound having a structure of D-E, wherein D is a $M_1$ or $M_1M_2$, $M_1$ and $M_2$ each individually being an alkaline earth metal selected from the group consisting of Mg, Ca, Ba, and Sr, E is a metal oxide selected from the group consisting of $Al_2O_3$, $SiO_2$, $ZrO_2$, $TiO_2$, and $CeO_2$, wherein the catalytic material is attached to the support material.

35 Claims, 4 Drawing Sheets

(51) Int. Cl.

| | | |
|---|---|---|
| *B01J 23/78* | (2006.01) | |
| *C01B 3/40* | (2006.01) | |
| *B01J 37/02* | (2006.01) | |
| *B01J 37/08* | (2006.01) | |
| *B01J 21/00* | (2006.01) | |
| *B01J 23/00* | (2006.01) | |
| *B01J 23/42* | (2006.01) | |
| *B01J 23/46* | (2006.01) | |
| *B01J 23/63* | (2006.01) | |
| *B01J 23/755* | (2006.01) | |
| *B01J 35/00* | (2006.01) | |
| *B01J 35/10* | (2006.01) | |
| *C01B 31/18* | (2006.01) | |
| *B01J 21/16* | (2006.01) | |
| *B01J 37/04* | (2006.01) | |
| *C01B 3/26* | (2006.01) | |

(52) U.S. Cl.
CPC ............. *B01J 23/42* (2013.01); *B01J 23/464* (2013.01); *B01J 23/63* (2013.01); *B01J 23/755* (2013.01); *B01J 23/78* (2013.01); *B01J 23/83* (2013.01); *B01J 35/002* (2013.01); *B01J 35/1014* (2013.01); *B01J 37/0242* (2013.01); *B01J 37/08* (2013.01); *B01J 37/088* (2013.01); *C01B 3/40* (2013.01); *C01B 31/18* (2013.01); *B01J 21/16* (2013.01); *B01J 37/04* (2013.01); *B01J 2523/00* (2013.01); *C01B 3/26* (2013.01); *C01B 2203/0238* (2013.01); *C01B 2203/1041* (2013.01); *C01B 2203/1058* (2013.01); *Y02P 20/52* (2015.11)

(56) References Cited

U.S. PATENT DOCUMENTS

| | | | | |
|---|---|---|---|---|
| 4,329,259 A | * | 5/1982 | Antos | C10G 35/09 502/226 |
| 4,988,661 A | | 1/1991 | Arai et al. | 502/327 |
| 6,402,989 B1 | | 6/2002 | Gaffney | 252/373 |
| 6,416,731 B1 | | 7/2002 | Dohrup et al. | 423/653 |
| 6,878,667 B2 | | 4/2005 | Gaffney et al. | 502/241 |
| 7,070,752 B2 | | 7/2006 | Zeng et al. | 423/418.2 |
| 7,514,387 B2 | | 4/2009 | LaBarge | 502/439 |
| 8,133,463 B1 | | 3/2012 | Berry et al. | 423/418.2 |
| 8,241,600 B1 | | 8/2012 | Berry et al. | 423/418.2 |
| 2002/0177628 A1 | * | 11/2002 | Gaffney | B01J 23/8946 518/703 |
| 2004/0266615 A1 | * | 12/2004 | Watson et al. | 502/325 |
| 2011/0079543 A1 | | 4/2011 | Willis et al. | 208/119 |
| 2014/0005042 A1 | | 1/2014 | Feaviour | 502/304 |

FOREIGN PATENT DOCUMENTS

| | | |
|---|---|---|
| CN | 102416328 A | 4/2012 |
| EP | GB 2240284 | 7/1991 |
| EP | 1 124 635 | 8/2001 |
| EP | 1 230 146 | 8/2002 |
| EP | 2441517 | 4/2012 |
| WO | WO 00-16900 | 9/1999 |
| WO | WO 00/16899 | 3/2000 |
| WO | WO 01/28678 | 4/2001 |
| WO | WO 01/36323 | 5/2001 |

OTHER PUBLICATIONS

International Search Report issued in PCT/IB2014/001743 on Nov. 25, 2014.
Prasad, M.S., Reid, K.J. and Murray, H.H., "Kaolin: processing, properties and applications." Applied Clay Science, 6, 1991, 87-119.
Pinheiro, B. C. A. and Holanda, J. N. F. "Obtainment of porcelain floor tiles added with petroleum oily sludge." Ceramics International. 39 (1) 2013, 57-63.
Feriancova, A., Pajtasova, M., Palieskova, J., Ondrusova, J., M. Kopcova, M., Jona, E., Mojumda, S.C. "The influence of kaolin filler on thermal and spectral characteristics of rubberizing components without rubber." Journal of Thermal Analysis and Calorimetry 2013, 1-6.
Sarthak Gaura, Daniel J. Haynes, James J. Spivey. "Rh, Ni, and Ca substituted pyrochlore catalysts for dry reforming of methane." Applied Catalysis A: General 403 (2011) 142-151.
Devendra Pakhare; Daniel Haynes, Dushyant Shekhawat and James Spivey. Role of metal substitution in lanthanum zirconate pyrochlores (La2Zr2O7) for dry (CO2) reforming of methane (DRM). Appl Petrochem Res (2012) 2:27-35.
Gaur, Sarthak. Master's Thesis—Dry Reforming of Methane on Rhodium and Nickel Substituted Pyrochlore Catalysts. Date of submission: Apr. 21, 2011, ETH Zurich, Switzerland.
D. J. Haynes et al. "Catalytic partial oxidation of n-tetradecane using pyrochlores: Effect of Rh and Sr." Catalysis Today 136 (2008) 206-213.
J. R. Rostrup et al. "A review article: Hydrogen and synthesis gas by steam and CO2 reforming." Adv. Catal. 47 (2002) 65-139.
D. Pakhare et al. "Role of metal substitution in lanthanum zirconate pyrochlores." Appl. Petrochem Res. (2012) 2:27-35.
Barroso, M.N. et al. "Ni-catalysts supported on ZnxMgI-xAl$_2$O$_4$ for ethanol steam reforming: Influence of the substitution for Mg on catalytic activity and stability." Chemical Engineering Journal. vol. 222, pp. 142-149. 2013.
Barroso, M.N. et al. "Ni catalysts supported over MgAl$_2$O$_4$ modified with Pr for hydrogen production from ethanol steam reforming." Applied Catalysis A: General. vol. 394, issue 2—Jan, pp. 124-131. 2011.
Alvar, E.N. et al. "Mesoporous nanocrystalline MgAl2O4 spinel and its applications as support for Ni catalyst in dry reforming." Scripta Materialia. vol. 61, issue 2, pp. 212-215. 2009.
Nilsson, M. et al. "Catalytic properties of Pd supported on ZnO/ZnAl$_2$O$_4$/Al$_2$O$_3$ mixtures in dimethyl ether autothermal reforming." Applied Catalysis B: Environmental. vol. 86, issue 2—Jan, pp. 18-26. 2009.
Corthals, S. et al. "Influence of composition of MgAl$_2$O$_4$ supported NiCeO$_2$ZrO$_2$ catalysts on coke formation and catalyst stability for dry reforming of methane." Catalysis Today. vol. 138, issue 2—Jan, pp. 28-32. 2008.
Foletto, E.L. et al. "Preparation of Ni/Pt catalysts supported on spinel (MgAl$_2$O$_4$) for methane reforming." Journal of Power Sources. vol. 161, issue 1, pp. 531-534. 2006.
Becerra, A.M. et al. "An investigation on the presence of NiAl$_2$O$_4$ in a stable Ni on alumina catalyst for dry reforming." Journal of the Chilean Chemical Society. vol. 50, issue 2, pp. 465-469. 2005.
Guo, J. et al. "Dry reforming of methane over nickel catalysts supported on magnesium aluminate spinels." Applied Catalysis A: General. vol. 273, issue 2—Jan, pp. 75-82. 2004.

* cited by examiner

ALKALINE EARTH METAL/METAL OXIDE SUPPORTED CATALYSTS

CROSS REFERENCE TO RELATED APPLICATIONS

This application claims the benefit of U.S. Provisional Application No. 61/845,110, filed Jul. 11, 2013, and U.S. Provisional Application No. 61/821,522, filed May 9, 2013. The contents of the referenced applications are incorporated into the present application by reference.

BACKGROUND OF THE INVENTION

A. Field of the Invention

The invention generally concerns the use of a support material for hydrocarbon gas reforming catalysts. In particular, the support material includes an alkaline earth metal/metal oxide compound or a mixture of such compounds.

B. Description of Related Art

Synthesis gas or "syngas" is a gas mixture that includes carbon monoxide and hydrogen. Syngas is typically used as an intermediary gas to produce a wide range of various products, such as mixed alcohols, hydrogen, ammonia, i-$C_4$ hydrocarbons, mixed alcohols, Fischer-Tropsch products (e.g., waxes, diesel fuels, olefins, gasoline, etc.) methanol, ethanol, aldehydes, alcohols, etc. Syngas can also be used as a direct fuel source, such as for internal combustible engines.

One of the more common methods of producing syngas is by oxidizing hydrocarbon gases such as methane. For instance, the controlled oxidation of methane can be carried out using carbon dioxide, water, or oxygen or a combination of such materials. For industrial scale applications, methane can be reformed into syngas by using steam, such as by the following reaction:

$$CH_4 + H_2O \rightarrow CO + 3H_2$$

The ratio of $CO/H_2$ obtained by using this process is approximately 1:3 or 0.33. One of the issues with this ratio is that applications for producing aldehydes, alcohols, and ammonia require a ratio of $CO/H_2$ of about 1:1 or 1. Therefore, the current solution is to remove excess $H_2$ from the produced syngas via separation techniques which can decrease efficient production while simultaneously increasing associated costs. A 1:1 ratio can also be obtained by replacing water with carbon dioxide or a mixture of carbon dioxide and oxygen, such as by the following reactions:

$$CH_4 + CO_2 \rightarrow 2CO + 2H_2$$

$$2CH_4 + CO_2 + O_2 \rightarrow 3CO + 3H_2 + H_2O.$$

Catalysts are used to drive the above reforming reactions. One of the issues with current catalysts is that they are prone to sintering, which can reduce the active surface area of the catalytic material, thereby reducing the efficiency of the catalyst. Another issue is that of carbon formation or coking, which can also occur on the catalytic material. The catalysts used in the above methane/carbon dioxide reforming reactions are especially prone to sintering and coking issues, both on the surface of the actual catalytic material and the surface of the support material.

SUMMARY OF THE INVENTION

It has been discovered that various alkaline earth metal/metal oxide compounds, or mixtures of such compounds, can be used as a support for various catalytic materials that are typically used in syngas production. Catalytic materials supported by these compounds have been shown to have reduced coking and sintering issues during the syngas production/reaction process. Further, their durability is superior to those that are currently available on the market.

In one aspect of the present invention, there is disclosed a hydrocarbon gas reforming supported catalyst comprising a catalytic material capable of catalyzing the production of a gaseous mixture comprising hydrogen and carbon monoxide from a hydrocarbon gas, and a support material comprising an alkaline earth metal/metal oxide. The alkaline earth metal/metal oxide can be a mono or mixed alkaline earth metal/metal oxide having a general structure of D-E, where D is a $M_1$ or $M_1M_2$, $M_1$ and $M_2$ each individually being an alkaline earth metal selected from the group consisting of Mg, Ca, Ba, and Sr, E is a metal oxide selected from the group consisting of $Al_2O_4$, $SiO_2$, $ZrO_2$, $TiO_2$, and $CeO_2$, wherein the catalytic material is attached to the support material. In particular instances, D can be $M_1$ and E can be $Al_2O_4$ (e.g., $MgAl_2O_4$, $CaAl_2O_4$, $BaAl_2O_4$, or $SrAl_2O_4$). In other instances, D can be $M_1$ and E can be $Si_2O_2$ (e.g., $MgSi_2O_2$, $CaSi_2O_2$, $BaSi_2O_2$, or $SrSi_2O_2$). In further instances, D can be $M_1$ and E can be $ZrO_2$ (e.g., $MgZrO_2$, $CaZrO_2$, $BaZrO_2$, or $SrZrO_2$). In even further instances, D can be $M_1$ and E can be $TiO_2$ (e.g., $MgTiO_2$, $CaTiO_2$, $BaTiO_2$, or $SrTiO_2$). In other instances, D can be $M_1$ and E can be $CeO_2$ (e.g., $MgCeO_2$, $CaCeO_2$, $BaCeO_2$, or $SrCeO_2$). Another example is where D can be $M_1M_1$ (e.g., MgCa, MgBa, MgSr, BaCa, BaSr, or CaSr) and E can be $Al_2O_4$ (e.g., $MgCaAl_2O_4$, $MgBaAl_2O_4$, $MgSrAl_2O_4$, $BaCaAl_2O_4$, $BaSrAl_2O_4$, or $CaSrAl_2O_4$. In another instance, D can be $M_1M_1$ (e.g., MgCa, MgBa, MgSr, BaCa, BaSr, or CaSr) and E can be $Si_2O_4$ (e.g., $MgCaSi_2O_4$, $MgBaSi_2O_4$, $MgSrSi_2O_4$, $BaCaSi_2O_4$, $BaSrSi_2O_4$, or $CaSrSi_2O_4$. In a further instance, D can be $M_1M_1$ (e.g., MgCa, MgBa, MgSr, BaCa, BaSr, or CaSr) and E can be $ZrO_2$ (e.g., $MgCaZrO_2$, $MgBaZrO_2$, $MgSrZrO_2$, $BaCaZrO_2$, $BaSrZrO_2$, or $CaSrZrO_2$). In yet another instance, D can be $M_1M_1$ (e.g., MgCa, MgBa, MgSr, BaCa, BaSr, or CaSr) and E can be $TiO_2$ (e.g., $MgCaTiO_2$, $MgBaTiO_2$, $MgSrTiO_2$, $BaCaTiO_2$, $BaSrTiO_2$, or $CaSrTiO_2$). In still another instance, D can be $M_1M_1$ (e.g., MgCa, MgBa, MgSr, BaCa, BaSr, or CaSr) and E can be $CeO_2$ (e.g., $MgCaCeO_2$, $MgBaCeO_2$, $MgSrCeO_2$, $BaCaCeO_2$, $BaSrCeO_2$, or $CaSrCeO_2$). Further, the support material can include a combination of any of these alkaline earth metal/metal oxide compounds (e.g., the support can include at least 2, 3, 4, 5, 6, 7, 8, 9, or more different alkaline earth metal/metal oxides). The attachment can be through chemical bonds or physical bonds or both. In particular instances, the bonds can be M1-M2 bonds (where M1 is a metal from the catalyst and M2 is a metal from the alkaline earth metal/metal oxide compound) and/or (M1-O bonds (where M1 is a metal from the catalyst and O is oxygen from the alkaline earth metal/metal oxide compound). In certain aspects, the supported catalyst can include at least 1, 5, 10, 15, 20, 25, 30, 35, 40, 45, 50%, or more by weight of the catalytic material and/or at least 1, 5, 10, 15, 20, 25, 30, 35, 40, 45, 50, 60, 70, 80, 90%, or more by weight of the support material. The support material can comprise or consist essentially of or consist of the alkaline earth metal/metal oxide compound, or mixtures of said compounds. In particular aspects, the supported catalyst comprises 5% to 50% by weight of the catalytic material and 95% to 50% by weight of the support material or 10% to 20% by weight of the catalytic material and 90% to 80% by weight of the support material. The support material and/or the catalysts can be in powdered or particulate form. The size of the particles can vary as needed for small or lab scale applications or for large or industrial scale applications. In one particular instance, the size of the particles can range from 5 to 300 μm. Alternatively, the support material or the catalyst can have a fabricated geometry (e.g., a pellet, foam, honeycomb, monolith, etc.). The catalytic material can be dispersed throughout the surface of the support material. In particular instances, the catalyst is capable of reducing carbon formation or coking on the surface of said supported catalyst when subjected to temperatures greater than 700° C., greater than 725° C., 750° C., 775° C., or greater than 800° C. or from a range of greater than 700° C., 725° C., 750° C., 775° C., or 800° C. to 1100° C., or from a range of greater than 700° C., 725° C., 750° C., 775° C., or 800° C. to 1000° C., or from a range of greater than 700° C., 725° C., 750° C., 775° C., or 800° C. to 900° C. Similarly or alternatively, the supported catalyst is capable of reducing sintering of the catalytic material or of the alkaline earth metal/metal oxide support material when subjected to temperatures greater than 700° C., greater than 725° C., 750° C., 775° C., or greater than 800° C. or from a range of greater than 700° C., 725° C., 750° C., 775° C., or 800° C. to 1100° C., or from a range of greater than 700° C., 725° C., 750° C., 775° C., or 800° C. to 1000° C., or from a range of greater than 700° C., 725° C., 750° C., 775° C., or 800° C. to 900° C. Therefore, the reaction temperature for syngas production using the catalysts of the present invention can be a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C. The catalytic material can be a pyrochlore. A non-limiting example of a pyrochlore is one having the structure of:

$$A_x B_{y-z} C_z O_7$$

wherein, A is a trivalent ion of an element of La, Ce, Nd, Bi, Sc, or Y, where $0 \leq x \leq 2$, B is a tetravalent ion of an element of Zr, Pt, Pd, Ni, Mo, Rh, Ru, or Ir, where $0 \leq y-z \leq 2$, C is a bivalent, trivalent or tetravalent ion of Ba, Ca, Cu, Mg, Ru, Rh, Pt, Pd, Ni, Co, or Mo, where $0 \leq z \leq 2$. The variables x, y, and z are each numbers (e.g., real numbers). Alternatively, the catalytic material can be a metal catalyst, a metal oxide catalyst, metal oxide supported metal catalysts (e.g., metals such as Pt, Pd, Ir, Ni, Co, Rh, Ru, La, Mg, Ca, Sr, Ba, Fe, Sn, Cu, Zn, supported on various metal oxides such as $Al_2O_3$, $SiO_2$, SBA-15, MCM-40, $TiO_2$, $ZrO_2$, $CeO_2$, etc., or perovskite-type solid solutions). Non-limiting examples of metal catalysts include Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof. Non-limiting examples of metal oxide catalysts include $La_2O_3$, $Ru_2O_3$, $CeO_2$, $ZrO_2$, ZnO, $MoO_3$, $WO_3$, $Nb_2O_5$, or $Ta_2O$, or any combination thereof. In particular instances, the metal can be Ni, Pt, Rh, or Ru or any combination thereof. In particular instances, the catalytic material is $La_2Ni_{0.11}Zr_{1.89}O_7$ and the support material is $MgAl_2O_4$. In certain aspects, the catalytic material comprises La and Ni, and the support material comprises $MgAl_2O_4$. In a particular aspect, the catalyst can have the following formula: 11.5 wt % La/4.8 wt % Ni/$MgAl_2O_4$. In other instances, the catalytic material comprises Ni, and the support material comprises $MgAl_2O_4$. In a particular aspect, the catalyst can have the following formula: 10 wt. % Ni/$MgAl_2O_4$. In certain aspects, the catalytic material comprises Ni and Pt. In a particular aspect, the catalyst can have the following formula: 7.5 wt. % Ni/2.5 wt. % Pt/$MgAl_2O_4$). In other instances, the catalytic material comprises Ni and Rh. In a particular aspect, the catalyst can have the following formula: 7.5 wt. % Ni/2.5 wt. % Rh/$MgAl_2O_4$. The hydrocarbon gas can be methane.

Also disclosed is a composition or dispersion comprising a continuous phase comprising a solvent and a catalytic material capable of catalyzing the production of a gaseous mixture comprising hydrogen and carbon monoxide from a hydrocarbon gas, wherein the catalytic material is solubilized in the solvent and a dispersed phase comprising a support material or an alkaline earth metal/metal oxide compound discussed above and/or throughout this specification. Non-limiting examples of solvents include water, methanol, ethanol, propanol or isopropanol, butanol, or mixtures thereof. The dispersion can also include additional materials, ingredients, additives. Such additional materials, ingredients, additives can be those that stabilize the dispersion, aid in solubility of the catalytic material, help reduce coking or sintering during use of the catalyst, etc. In one instance, the additive is citric acid.

In another embodiment of the invention there is disclosed a method of producing the hydrocarbon gas reforming supported catalyst discussed above and/or throughout this specification. The method can include evaporating the solvent from the above dispersion, thereby resulting in or producing said hydrocarbon gas reforming supported catalyst. The catalytic material is then attached to the support material or alkaline earth metal/metal oxide compounds disclosed above and throughout this specification.

Also disclosed is a method of producing a gaseous mixture comprising contacting a reactant gas mixture comprising a hydrocarbon and an oxidant with any one of the hydrocarbon gas reforming supported catalysts discussed above and/or throughout this specification under conditions sufficient to produce a gaseous mixture comprising hydrogen and carbon monoxide. Further, there is disclosed a method of catalytically reforming a reactant gas mixture comprising providing a reactant gas mixture comprising a hydrocarbon and an oxidant, providing any one of the hydrocarbon gas reforming supported catalysts discussed above and/or throughout this specification, and contacting the reactant gas mixture with the hydrocarbon gas reforming supported catalyst under conditions sufficient to produce a gaseous mixture comprising carbon monoxide and hydrogen. Such conditions sufficient to produce said gaseous mixture can include a temperature range of greater than 700° C. to 1100° C. or a range from 725° C., 750° C., 775° C., or 800° C. to 900° C., 1000° C., or 1100° C. or from 800° C. to 1000° C. or from 800° C. to 1100° C., a pressure range of from 1 bara to 30 bara, and/or a gas hourly space velocity (GHSV) ranging from 500 to 10000 $h^{-1}$. In particular instances, the hydrocarbon comprises methane. In certain aspects, the oxidant comprises carbon dioxide, oxygen, or water, or any combination thereof. In particular instances, the hydrocarbon comprises methane and the oxidant comprises carbon dioxide or a mixture of carbon dioxide and oxygen, and the ratio of carbon monoxide to hydrogen in the produced gaseous mixture is approximately 1:1 or 1. In other aspects, the hydrocarbon comprises methane and the oxidant comprises water (e.g., water vapor or steam), and the ratio of carbon monoxide to hydrogen in the produced gaseous mixture is approximately 1:3 or 0.33. The reactant gas mixture can include natural gas, liquefied petroleum gas comprising $C_2$-$C_5$ hydrocarbons, $C_6$+ heavy hydrocarbons (e.g., $C_6$ to $C_{24}$ hydrocarbons such as diesel fuel, jet fuel, gasoline, tars, kerosene, etc.), oxygenated hydrocarbons, and/or biodiesel, alcohols, or dimethyl ether. In particular instances, the reactant gas mixture has an overall oxygen to carbon atomic ratio equal to or greater than 0.9. The method can further include isolating and/or storing the produced gaseous mixture. The method can also include separating hydrogen from the produced gaseous mixture (such as by passing said produced gaseous mixture through a membrane to produce a hydrogen permeate). The method can include separating carbon monoxide from the produced gaseous mixture (such as by passing said produced gaseous mixture through a membrane to produce a carbon monoxide permeate). In certain aspects, the carbon formation or coking is reduced or does not occur on the supported catalyst and/or sintering is reduced or does not occur on the supported catalyst. In particular instances, carbon formation or coking and/or sintering is reduced or does not occur when said supported catalyst is subjected to temperatures at a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C.

Also disclosed are embodiments 1-47 as follows. Embodiment 1 is a hydrocarbon gas reforming supported catalyst comprising: (a) a catalytic material capable of catalyzing the production of a gaseous mixture comprising hydrogen and carbon monoxide from a hydrocarbon gas; and (b) a support material comprising an alkaline earth metal/metal oxide compound having a structure of D-E, wherein D is a $M_1$ or $M_1M_2$, $M_1$ and $M_2$ each individually being an alkaline earth metal selected from the group consisting of Mg, Ca, Ba, and Sr, and E is a metal oxide selected from the group consisting of $Al_2O_3$, $SiO_2$, $ZrO_2$, $TiO_2$, and $CeO_2$, wherein the catalytic material is attached to the support material. Embodiment 2 is the hydrocarbon gas reforming supported catalyst of embodiment 1, wherein D is $M_1$ and E is $Al_2O_3$. Embodiment 3 is the hydrocarbon gas reforming supported catalyst of embodiment 2, wherein the compound is $MgAl_2O_4$, $CaAl_2O_4$, $BaAl_2O_4$, or $SrAl_2O_4$. Embodiment 4 is the hydrocarbon gas reforming supported catalyst of embodiment 3, wherein the compound is $MgAl_2O_4$. Embodiment 5 is the hydrocarbon gas reforming supported catalyst of embodiment 1, wherein D is $M_1M_2$ and E is $Al_2O_3$. Embodiment 6 is the hydrocarbon gas reforming supported catalyst of embodiment 5, wherein $M_1M_2$ is MgCa, MgBa, MgSr, BaCa, BaSr, or CaSr. Embodiment 7 is the hydrocarbon gas reforming supported catalyst of any one of embodiments 1 to 6, wherein the supported catalyst comprises at least 1, 5, 10, 15, 20, 25, 30, 35, 40, 45, 50%, or more by weight of the catalytic material. Embodiment 8 is the hydrocarbon gas reforming supported catalyst of embodiment 7, wherein the supported catalyst comprises at least 1, 5, 10, 15, 20, 25, 30, 35, 40, 45, 50, 60, 70, 80, 90%, or more by weight of the support material. Embodiment 9 is the hydrocarbon gas reforming supported catalyst of embodiment 8, wherein the supported catalyst comprises 5% to 50% by weight of the catalytic material and 95% to 50% by weight of the support material or 10% to 20% by weight of the catalytic material and 90% to 80% by weight of the support material. Embodiment 10 is the hydrocarbon gas reforming supported catalyst of any one of embodiments 1 to 9, wherein the support material is in particulate or powdered form and wherein the catalytic material is attached to the surface of the support material. Embodiment 11 is the hydrocarbon gas reforming supported catalyst of embodiment 10, wherein the particle size of the support material ranges from 5 to 300 μm. Embodiment 12 is the hydrocarbon gas reforming supported catalyst of any one of embodiments 1 to 11, wherein the support material is in non-powdered form or has a fabricated geometry and wherein the catalytic material is attached to the surface of the support material. Embodiment 13 is the hydrocarbon gas reforming supported catalyst of embodiment 12, wherein the fabricated geometry is a pellet, foam, honeycomb, or monolith. Embodiment 14 is the hydrocarbon gas reforming supported catalyst of any one of embodiments 1 to 13, wherein the catalytic material is dispersed on the surface of the support material. Embodiment 15 is the hydrocarbon gas reforming supported catalyst of any one of embodiments 1 to 14, wherein the supported catalyst is capable of reducing carbon formation on the surface of said supported catalyst when subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. Embodiment 16 is the hydrocarbon gas reforming supported catalyst of any one of embodiments 1 to 15, wherein the supported catalyst is capable of reducing sintering of the catalytic material or of the clay support material when subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. Embodiment 17 is the hydrocarbon gas reforming supported catalyst of any one of embodiments 1 to 16, wherein the catalytic material comprises a pyrochlore of: $A_xB_{y-z}C_zO_7$, wherein, A is a trivalent ion of an element of La, Ce, Nd, Bi, Sc, or Y, where $0 \le x \le 2$, B is a tetravalent ion of an element of Zr, Pt, Pd, Ni, Mo, Rh, Ru, or Ir, where $0 \le y-z \le 2$, C is a bivalent, trivalent or tetravalent ion of Ba, Ca, Cu, Mg, Ru, Rh, Pt, Pd, Ni, Co, or Mo, where $0 \le z \le 2$. Embodiment 18 is the hydrocarbon gas reforming supported catalyst of any one of embodiments 1 to 16, wherein the catalytic material is a metal catalyst or a metal oxide catalyst. Embodiment 19 is the hydrocarbon gas reforming supported catalyst of embodiment 18, wherein the metal catalyst or metal oxide catalyst comprises Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof. Embodiment 20 is the hydrocarbon gas reforming supported catalyst of embodiment 19, wherein the metal catalyst comprises Ni, Pt, Rh, or Ru or any combination thereof. Embodiment 21 is the hydrocarbon gas reforming supported catalyst of embodiment 1, wherein the catalytic material comprises $La_2Ni_{0.11}Zr_{1.89}O_7$ and the support material comprises $MgAl_2O_4$. Embodiment 22 is the hydrocarbon gas reforming supported catalyst of embodiment 1, wherein the catalytic material comprises La and Ni and the support material comprises $MgAl_2O_4$. Embodiment 23 is the hydrocarbon gas reforming supported catalyst of embodiment 22, wherein the catalyst has the following formula: 11.5 wt. % La/4.8 wt. % Ni/$MgAl_2O_4$, 10 wt. % Ni/$MgAl_2O_4$, 7.5 wt. % Ni/2.5 wt. % Pt/$MgAl_2O_4$), or 7.5 wt. % Ni/2.5 wt. % Rh/$MgAl_2O_4$. Embodiment 24 is the hydrocarbon gas reforming supported catalyst of any one of embodiments 1 to 23, wherein the hydrocarbon gas is methane. Embodiment 25 is a composition comprising: (a) a continuous phase comprising a solvent and a catalytic material capable of catalyzing the production of a gaseous mixture comprising hydrogen and carbon monoxide from a hydrocarbon gas, wherein the catalytic material is solubilized in the solvent; and (b) a dispersed phase comprising an alkaline earth metal/metal oxide compound in powdered or particulate form, said compound having a structure of D-E, wherein D is a $M_1$ or $M_1M_2$, $M_1$ and $M_2$ each individually being an alkaline earth metal selected from the group consisting of Mg, Ca, Ba, and Sr, E is a metal oxide selected from the group consisting of $Al_2O_3$, $SiO_2$, $ZrO_2$, $TiO_2$, and $CeO_2$. Embodiment 26 is the composition of embodiment 25, wherein the solvent is water, methanol, ethanol, propanol or isopropanol, butanol, or mixtures thereof. Embodiment 27 is a method of producing the hydrocarbon gas reforming supported catalyst of any one of embodiments 1 to 24 comprising obtaining the composition of any one of embodiments 25 to 26, and evaporating the solvent from said composition, wherein the hydrocarbon gas reforming supported catalyst is produced, and wherein the catalytic material is attached to the alkaline earth metal/metal oxide compound. Embodiment 28 is a method of producing a gaseous mixture comprising contacting a reactant gas mixture comprising a hydrocarbon and an oxidant with the hydrocarbon gas reforming supported catalyst of any one of embodiments 1 to 24 under conditions sufficient to produce a gaseous mixture comprising hydrogen and carbon monoxide. Embodiment 29 is a method of catalytically reforming a reactant gas mixture comprising: (a) providing a reactant gas mixture comprising a hydrocarbon and an oxidant; (b) providing the hydrocarbon gas reforming supported catalyst of any one of embodiments 1 to 24; and (c) contacting the reactant gas mixture with the hydrocarbon gas reforming supported catalyst under conditions sufficient to produce a gaseous mixture comprising carbon monoxide and hydrogen. Embodiment 30 is the method of any one of embodiments 28 to 29, wherein the hydrocarbon comprises methane. Embodiment 31 is the method of any one of embodiments 28 to 29, wherein the oxidant comprises carbon dioxide, oxygen, or water, or any combination thereof. Embodiment 32 is the method of embodiment 31, wherein the hydrocarbon comprises methane and the oxidant comprises carbon dioxide or a mixture of carbon dioxide and oxygen. Embodiment 33 is the method of embodiment 32, wherein the ratio of carbon monoxide to hydrogen in the produced gaseous mixture is approximately 1. Embodiment 34 is the method of embodiment 32, wherein the hydrocarbon comprises methane and the oxidant comprises water. Embodiment 35 is the method of embodiment 34, wherein the water is water vapor. Embodiment 36 is the method of any one of embodiments 34 to 35, wherein the ratio of carbon monoxide to hydrogen in the produced gaseous mixture is approximately 0.33. Embodiment 37 is the method of any one of embodiments 28 to 29, wherein the reactant gas mixture comprises natural gas. Embodiment 38 is the method of any one of embodiments 28 to 29, wherein the reactant gas mixture comprises liquefied petroleum gas comprising $C_2$-$C_5$ hydrocarbons. Embodiment 39 is the method of any one of embodiments 28 to 29, wherein the reactant gas mixture comprises $C_6$+ heavy hydrocarbons. Embodiment 40 is the method of embodiment 39, wherein the $C_6$+ heavy hydrocarbons comprise diesel fuel, jet fuel, gasoline, tars, or kerosene. Embodiment 41 is the method of any one of embodiments 28 to 29, wherein the reactant gas mixture comprises oxygenated hydrocarbons. Embodiment 42 is the method of embodiment 41, wherein the oxygenated hydrocarbons comprise biodiesel, alcohols, or dimethyl ether. Embodiment 43 is the method of any one of embodiments 28 to 42, wherein the reactant gas mixture has an overall oxygen to carbon atomic ratio equal to or greater than 0.9. Embodiment 44 is the method of any one of embodiments 28 to 43, further comprising contacting the reactant gas mixture with the hydrocarbon gas reforming supported catalyst at a temperature ranging from 700° C. to 1100° C. or a range from 725° C., 750° C., 775° C., or 800° C. to 900° C., 1000° C., or 1100° C., 800° C. to 1000° C., at a pressure ranging from 1 bara to 30 bara, and/or at a gas hourly space velocity (GHSV) ranging from 500 to 10000 $h^{-1}$. Embodiment 45 is the method of any one of embodiments 28 to 44, wherein carbon formation is reduced or does not occur on the supported catalyst. Embodiment 46 is the method of any one of embodiments 28 to 45, wherein sintering is reduced or does not occur on the supported catalyst. Embodiment 47 is the method of any one of embodiments 45 to 46, wherein carbon formation and/or sintering is reduced or does not occur when said supported catalyst is subjected to temperatures greater than 700° C. to 1100° C. or a range from 725° C., 750° C., 775° C., or 800° C. to 900° C., 1000° C., or 1100° C.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the catalysts of the present invention are their ability to reduce sintering and coking on the catalytic material and/or on the alkaline earth metal/metal oxide compound support material.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

The currently available catalysts used to reform hydrocarbons into syngas are prone to coking and sintering, both of which can lead to inefficient catalyst performance and ultimately failure of the catalyst after relatively short periods of use. This can lead to inefficient syngas production as well increased costs associated with its production.

A discovery has been made that avoids the coking and sintering issues described above. The discovery is based on the use of the alkaline earth metal/metal oxide compounds as a support for the catalytic material. Without wishing to be bound by theory, it is believed that the basicity of these compounds allow for the efficient adsorption of carbon dioxide while also suppressing carbon deposition on the surface of the catalysts of the present invention, thereby reducing the incidence of coking and sintering when the catalysts of the present invention are used to produce syngas.

These and other non-limiting aspects of the present invention are discussed in further detail in the following sections.

A. Alkaline Earth Metal/Metal Oxide Support

The support material of the present invention can include an alkaline earth metal/metal oxide such as one having the following general structure: D-E, where D is a M$_1$ or M$_1$M$_2$, and M$_1$ and M$_2$ are each individually an alkaline earth metal selected from the group consisting of Mg, Ca, Ba, and Sr, and E is a metal oxide selected from the group consisting of Al$_2$O$_4$, SiO$_2$, ZrO$_2$, TiO$_2$, and CeO$_2$. Specific compounds are disclosed above and throughout this specification. These compounds are commercially available from a wide range of sources (e.g., Sigma-Aldrich® Co. LLC (St. Louis, Mo., USA); Alfa Aesar GmbH & Co KG, A Johnson Matthey Company (Germany)).

Alternatively, the support materials can be made by the process used in the examples section of this specification or by processes known to those of ordinary skill in the art (e.g., precipitation/co-precipitation, sol-gel, templates/surface derivatized metal oxides synthesis, solid-state synthesis, of mixed metal oxides, microemulsion technique, solvothermal, sonochemical, combustion synthesis, etc.).

B. Catalytic Materials

It is contemplated that any of the known catalytic materials that are currently used in producing syngas from hydrocarbons can be used in the context of the present invention. Such catalytic materials can be supported by the clay minerals discussed above and throughout this specification, thereby resulting in a hydrocarbon gas reforming clay mineral supported catalyst of the present invention. Non-limiting examples of such catalysts can include metal catalysts (e.g., Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof), metal oxide catalysts (e.g., La$_2$O$_3$, Ru$_2$O$_3$, CeO$_2$, ZrO$_2$, ZnO, MoO$_3$, WO$_3$, Nb$_2$O$_5$, and/or Ta$_2$O), pyrochlore catalysts, and other known catalysts used in the production of syngas from hydrocarbons (e.g., perovskites type solid solutions, various metals like Pt, Pd, Ir, Ni, Co, Rh, Ru, La, Mg, Ca, Sr, Ba, Fe, Sn, Cu, or Zn supported on various metal oxides such as Al$_2$O$_3$, SiO$_2$, SBA-15, MCM-40, TiO$_2$, ZrO$_2$, CeO$_2$, etc.). Non-limiting examples of pyrochlore catalysts include those having the following structure:

$A_xB_{y-z}C_zO_7$ wherein, A is a trivalent ion of an element of La, Ce, Nd, Bi, Sc, or Y, where 0≤x≤2, B is a tetravalent ion of an element of Zr, Pt, Pd, Ni, Mo, Rh, Ru, or Ir, where 0≤y-z≤2, C is a bivalent, trivalent or tetravalent ion of Ba, Ca, Cu, Mg, Ru, Rh, Pt, Pd, Ni, Co, or Mo, where 0≤z≤2.

C. Methods of Making and Using the Alkaline Earth Metal/Metal Oxide Supported Catalysts The alkaline earth metal/metal oxide supported catalysts of the present invention can be made by processes known in the art that provide attachment of the catalytic material to the surface of the alkaline earth metal/metal oxide compounds. The attachment can be through chemical bonds or physical bonds or both. In particular instances, the bonds can be M1-M2 bonds (where M1 is a metal from the catalyst and M2 is a metal from the alkaline earth metal/metal oxide compound) or M1-O bonds (where M1 is a metal from the catalyst and O is oxygen from alkaline earth metal/metal oxide compound).

In addition to known methods, it has been discovered that the following process could be used to prepare the alkaline earth metal supported catalysts of the present invention:

1. Preparation of a dispersion:
   (a) Obtain a solution that includes a solvent (e.g., any solvent that can solubilize the catalytic material—non-limiting examples include water, methanol, ethanol, propanol, isopropanol, butanol, or mixtures thereof) and a catalytic material dissolved in said solvent.
   (b) Obtain an alkaline earth metal/metal oxide compound, such as one described above. It can be in particulate or powdered form.
   (c) Mix the compound with the solvent to create a dispersion, where the continuous phase includes the solution and the discontinuous/dispersed phase includes the compound. Mixing can occur for a period of time to create the dispersion and to contact the alkaline earth metal/metal oxide compound with the catalytic material. In one non-limiting aspect, the mixing time can occur for 5, 10, 15, 20, 25, 30, 40, 50, 60, or more minutes. In particular instances, the mixing can occur for about 10 to about 20 minutes or about 15 minutes. Any type of mixing apparatus can be used.
   (d) Optionally, additional materials or ingredients or other alkaline earth metal/metal oxide compounds can be added to stabilize the dispersion, modify the resulting catalyst or clay mineral, etc. For instance, a chelating agent (e.g., citric acid, EDTA, disodium EDTA, trisodium EDTA, EGTA, phosphoric acid, succinic acid, etc.) can be added to keep the metal ions apart during the initial stages of synthesis, which leads to the formation of smaller particles in catalysts. Smaller particles can result in higher surface area and pore volume which can have a positive effect on the activity of the catalysts of the present invention.
2. Processing of the dispersion to create a catalyst:
   (a) Subject the dispersion to a drying step such that the solvent is removed. An evaporation apparatus such as a rotary evaporator can be used. The resulting sample is dried and in powdered or particulate form.
   (b) The sample from (a) can then be subjected to a calcination step. Such a step can include placing the sample in a ceramic crucible and subjecting it to heat (e.g., from a muffle furnace). The sample can first be subjected to a temperature of 150° C. for 2 hours followed by 900° C. for 8 hours, with the temperature increasing at a rate of 10° C./minutes.

The obtained material can then be used as a catalyst to produce syngas. It is believed that no coking or sintering will be observed when the catalyst is used at temperatures of at least 800° C., whereas coking may be observed at temperatures of 700° C. Therefore, the reaction temperature for syngas production using the catalysts of the present invention can be a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C. In addition to temperature, a pressure range from 1 bara to 30 bara, and/or at a gas hourly space velocity (GHSV) range from 500 to 10000 $h^{-1}$ can be used as the reaction conditions for producing syngas from a hydrocarbon material and the catalysts of the present invention.

A benefit of this process of making and using the catalyst is its simplicity and ease of scalability for industrial/large scale applications.

The carbon dioxide in the gaseous feed mixture used in the process of the invention can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as starting material in the process of the invention is that it can reduce the amount of carbon dioxide emitted to the atmosphere (e.g., from a chemical production site). The hydrogen in the feed may also originate from various sources, including streams coming from other chemical processes, like ethane cracking, methanol synthesis, or conversion of methane to aromatics. The gaseous feed mixture comprising carbon dioxide and hydrogen used in the process of the invention may further contain other gases, provided that these do not negatively affect the reaction. Examples of such other gases include steam or oxygen. The hydrocarbon material used in the reaction can be methane.

Figure 1:
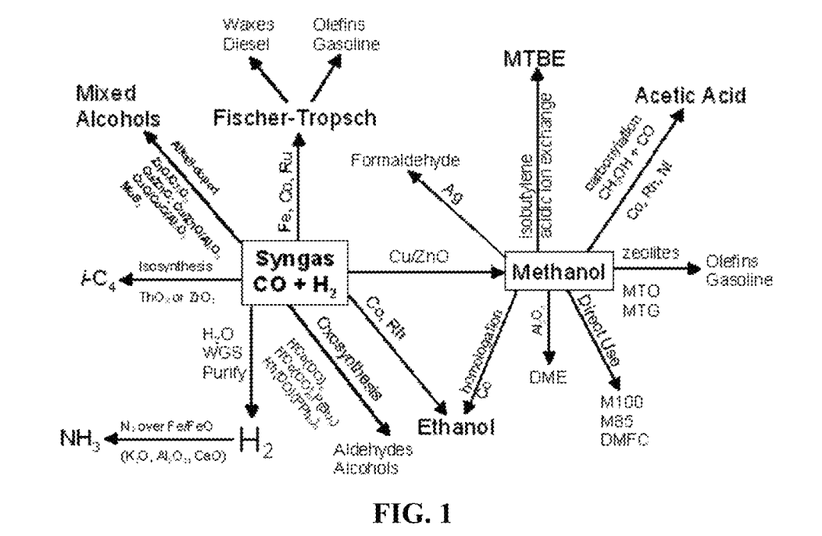
FIG. 1: Illustration of various products that can be produced from syngas.

The resulting syngas can then be used in additional downstream reaction schemes to create additional products. FIG. 1 is an illustration of various products that can be produced from syngas. Such examples include chemical products such as methanol production, olefin synthesis (e.g. via Fischer-Tropsch reaction), aromatics production, carbonylation of methanol, carbonylation of olefins, the reduction of iron oxide in steel production, etc.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of $MgAl_2O_4$ Supported Catalysts

The following procedure was used to synthesize 10 wt. % of $La_2Ni_{0.11}Zr_{1.89}O_7$ pyrochlore catalysts grafted on a $MgAl_2O_4$ support: 0.8 g of La $(NO_3)_3.6H_2O$, 0.4 g of $ZrCl_4$, 0.02 g of $NiCl_2.6H_2O$ was dissolved in 7.5 ml of de-ionized water to form a clear solution. 0.4 g of citric acid was added to the above solution. To this 5.1 g of $MgAl_2O_4$ powder was added and transferred the flask to the Rota evaporator. The material was allowed to mix in the Rota evaporator for 15 minutes and then evaporated the solvent under vacuum until the sample got dried completely. The $MgAl_2O_4$ powder was prepared as follows: equimolar solutions of an alkaline earth metal salt (12.81 g $Mg(NO_3)_2.6H_2O$ in 50 ml of $H_2O$) and aluminium nitrate (37.51 g $Al(NO_3)_3.9H_2O$ in 50 mL of $H_2O$) were mixed in a 500 mL beaker. To this solution, 27% v/v ammonium hydroxide solution was added drop wise under vigorous stirring until the pH of the slurry reached 9.8-10. After complete precipitation, stirring was continued for 1 hour. Thereafter, the precipitated slurry was digested in a water bath for 12 hours at 80° C. The residue was separated by centrifugation, washed six times with 200 mL portions of water to eliminate any residual ions. The residue was dried at 120° C. for 12 hours followed by calcination at 800° C. for 8 hours. The produced 10 wt. % of $La_2Ni_{0.11}Zr_{1.89}O_7$ pyrochlore catalyst supported on $MgAl_2O_4$ was determined to have a surface area of 42.8 $m^2/g$.

Figure 2:
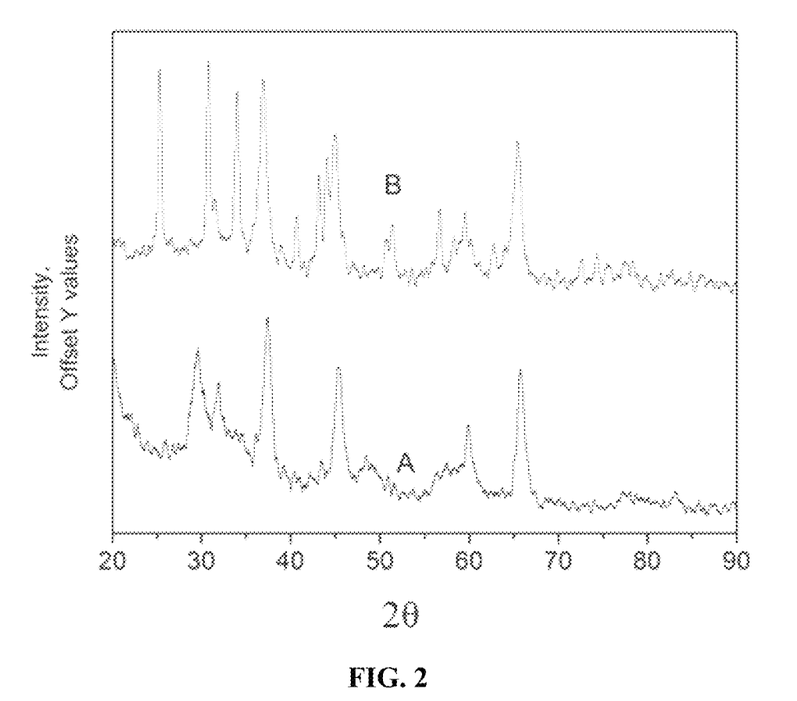
FIG. 2: X-ray diffractogram of (A) 20 wt % $La_2Ni_{0.11}Zr_{1.89}O_7$ on $MgAl_2O_4$ and (B) 11.5 wt % La and 4.8 wt % Ni on $MgAl_2O_4$.

A 20 wt. % of $La_2Ni_{0.11}Zr_{1.89}O_7$ on $MgAl_2O_4$ supported catalyst and a 11.5 wt. % La and 4.8 wt. % Ni on $MgAl_2O_4$ supported catalyst were each prepared by using the above procedure as well. The presence of diffraction peaks at 2θ equal to 29.64, 31.9 and 59.84 in FIG. 2 A confirms the presence of pyrochlore phase, and peaks at 2θ equal to 37.42, 45.38 and 65.78 confirms the $MgAl_2O_4$ phase in the catalyst (FIGS. 2A and B). The other peaks in (A) are because of La and Ni bimetallic phases in oxidized state.

The following procedure was used to synthesize 10 wt. % $CeO_2/2$ wt. % Pt catalyst supported on a $MgAl_2O_4$ support. The catalyst was synthesized by a two-step incipient wetness impregnation technique. First, the 10 wt. % $CeO_2/2$ wt. % Pt catalytic material was synthesized in a two-step process. In the first step 0.17 g of tetrammine platinum chloride hydrate salt was dissolved in pore volume equivalent of water and impregnated with dried 4.9 g of $MgAl_2O_4$. The resultant product was first dried at 125° C. for 2 hours followed by calcination at 200° C. for 4 hours. In a second step, a required amount of 0.5 g of cerium ammonium nitrate salt was dissolved in pore volume equivalent of water and impregnated with $Pt/MgAl_2O_4$ sample. The resultant mixture was first dried at 150° C. for 2 hours followed by calcination at 900° C. for 8 hours. Notably, greater than 10 wt. % of $CeO_2$ loaded catalysts can be prepared by changing the amount of cerium precursor. Also, the noble metal Pt can be replaced with Pd, Ni, Co, Fe, Cu, Zn, Mo, Rh, Ru, and Ir, with weight loading ranging from 0.1 to 30%.

The above procedures can be used to create the various alkaline earth metal/metal oxide supported catalysts of the present invention by modifying the ingredients and amounts of said ingredients. For instance, 10 wt. % $Ni/MgAl_2O_4$, 7.5 wt. % Ni+2.5 wt. % $Rh/MgAl_2O_4$, and 7.5 wt. % Ni+2.5% $Pt/MgAl_2O_4$ catalysts were prepared in these manner (Example 3).

Example 2

Catalytic Activity of 11.5% La+4.8% $Ni/MgAl_2O_4$

The ability of the 11.5 wt. % La and 4.8 wt. % Ni on $MgAl_2O_4$ supported catalyst for use in a $CO_2$ reforming of methane reaction was tested according to the following procedure. A sufficient amount of catalyst was loaded into the quartz reactor. The temperature was raised to 900° C. in the presence of nitrogen atmosphere. After reaching isothermal conditions a gas mixture of 10% $CH_4$+10% $CO_2$+80% $N_2$ was fed into the reactor. The outlet gas composition was measured using gas chromatograph over the duration of the reaction. The reaction pressure was 1 bara and the GHSV used was 5000 $h^{-1}$.

Figure 3:
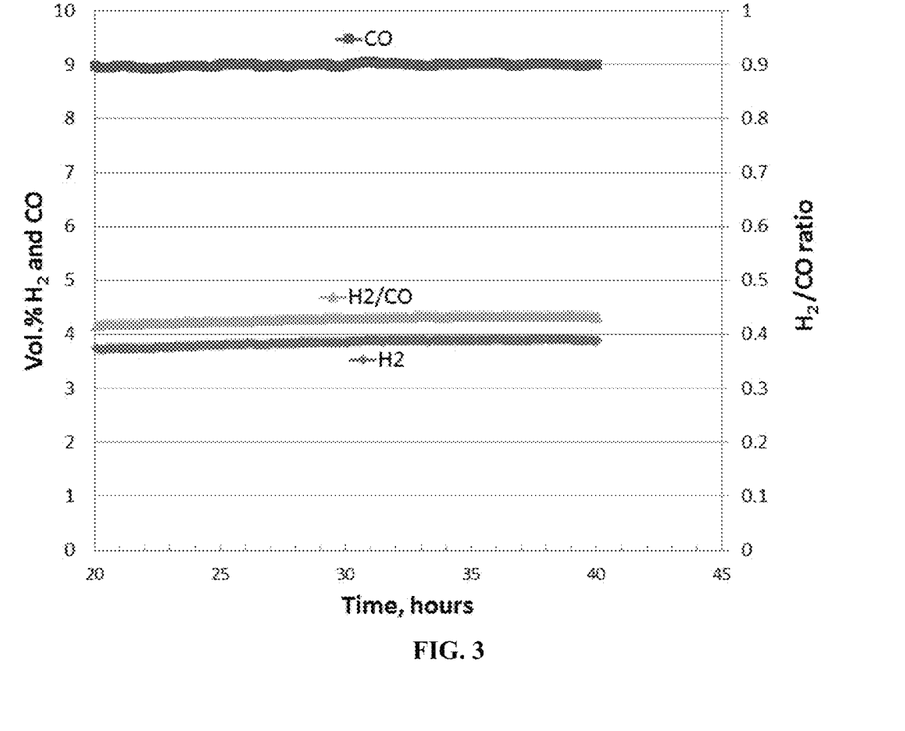
FIG. 3: $CO_2$ reforming of methane 11.5 wt % La and 4.8 wt % Ni on $MgAl_2O_4$ catalysts at 900° C. and 1 bara, GHSV=5000 $h^{-1}$.

The 11.5 wt. % La and 4.8 wt. % Ni supported on MgAl$_2$O$_4$. catalyst was found to be very active for more than 40 hours of operation without any coke formation (FIG. 3). The absence of coke was confirmed by using Transmission electron spectroscopy and Temperature programmed oxidation experiments.

Example 3

Catalytic Activity of 10% Ni/MgAl$_2$O$_4$, 7.5% Ni+2.5% Rh/MgAl$_2$O$_4$, and 7.5% Ni+2.5% Pt/MgAl$_2$O$_4$ The ability of three catalysts (10 wt. % Ni/MgAl$_2$O$_4$), (7.5 wt. % Ni+2.5% Rh/MgAl$_2$O$_4$), and (7.5 wt. % Ni+2.5% Pt/MgAl$_2$O$_4$) were tested for CO$_2$ reforming of methane at 800° C. and 1 bara pressure according to the following procedures.

Catalysts testing were performed in a highthroughput reactor system supplied by HTE, Germany. Reactors were of plug flow type and made up of steel SS316, with an inner ceramic liner. Ceramic liner with 5 mm in diameter and 55 cm in length was used to avoid coking due to methane cracking on steel surface. The gas between the inner steel surface and outer ceramic liner wall was sealed with the help of leak proof graphite ferrule, which ensures 100% feed gas passes through ceramic liner containing catalyst and inert material. Catalyst pellets were crushed and sieved between 100-300 μm. Catalyst sieve fraction was placed on top of inert material inside the ceramic liner. A mixture of (45% CO$_2$+45% CH$_4$+10% Ar) was used as feed. Argon was used as an internal standard for GC analysis. The catalyst in oxidized state was heated to 800° C. in the presence of (90% N$_2$+10% Ar). The (CH$_4$+CO$_2$) mixture was dosed in 4 steps with 5 minutes intervals replacing equivalent amount of nitrogen in each step. All catalysts were tested at 800° C., 1 bar pressure and approximately gas hourly space velocity (GHSV)=25,000 h$^{-1}$. After reaching feed composition of (45% CO$_2$+45% CH$_4$+10% Ar), gas analysis was started after 1 hour of equilibration time. Agillent GC 7867 was used for gas analysis. Methane and CO$_2$ conversion was calculated as follows:

$$\text{Methane conversion} = \frac{\text{mol of methane converted}}{\text{mol of methane in feed}} \times 100$$

$$\text{Carbon dioxide conversion} = \frac{\text{mol of carbon dioxide converted}}{\text{mol of carbon dioxide in feed}} \times 100$$

The ratio of hydrogen to carbon monoxide is calculated as follows, $$\text{H2/CO} = \frac{\text{mol of Hydrogen in product}}{\text{mol of carbon monoxide in product}}.$$

Figure 4:
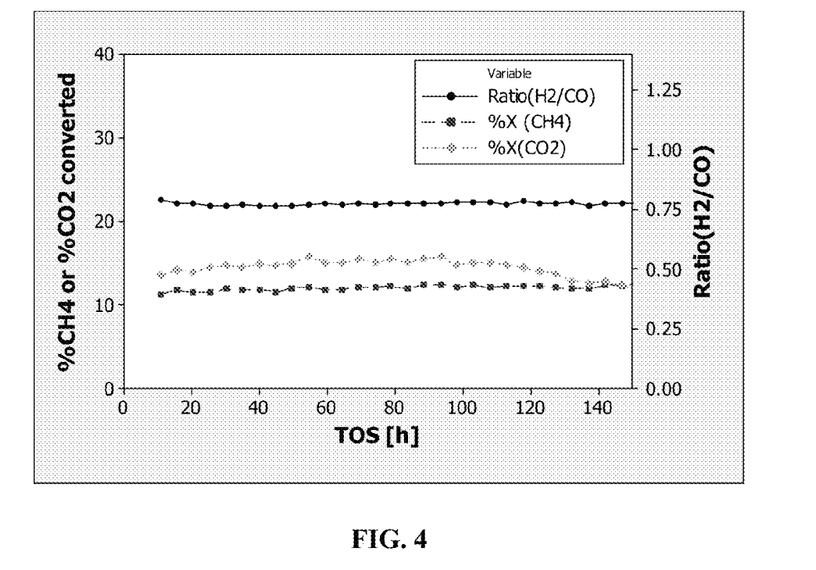
FIG. 4: Performance of 10% Ni/$MgAl_2O_4$ catalyst: $CH_4$ and $CO_2$ conversion; and $H_2$/CO ratio obtained at 800° C., 1 bara and GHSV=73,000 $h^{-1}$. Gas mixture containing 45% $CH_4$+45% $CO_2$+10% Ar was used as feed.
Figure 5:
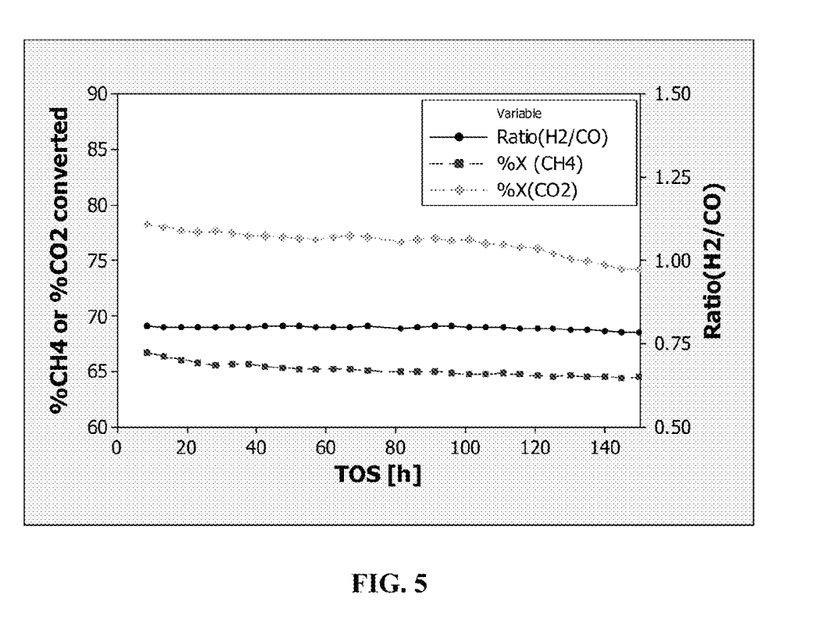
FIG. 5: Performance of 7.5% Ni+2.5% Pt/$MgAl_2O_4$ catalyst: $CH_4$ and $CO_2$ conversion; and $H_2$/CO ratio obtained at 800° C., 1 bara and GHSV=73,000 $h^{-1}$. Gas mixture containing 45% $CH_4$+45% $CO_2$+10% Ar was used as feed.
Figure 6:
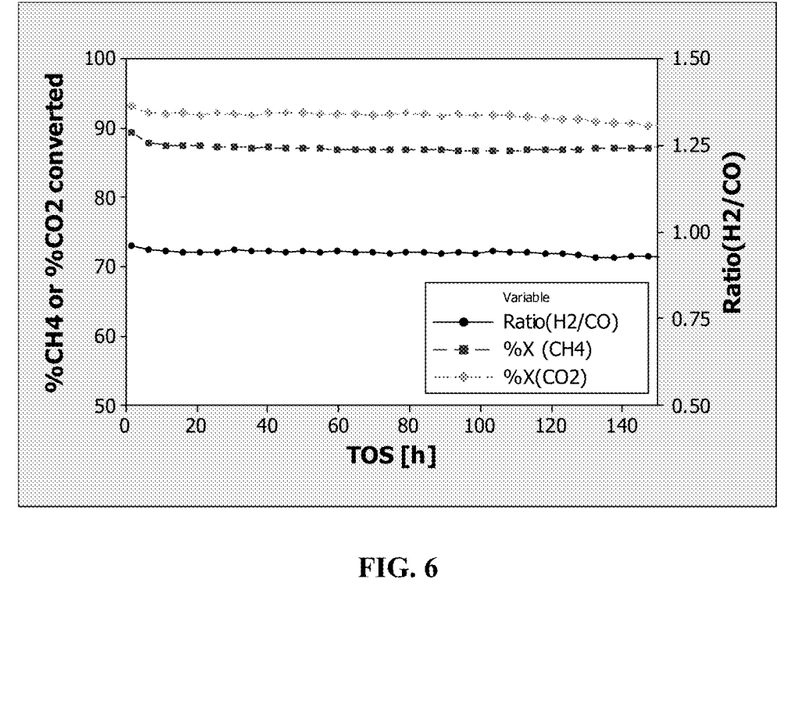
FIG. 6: Performance of 7.5% Ni+2.5% Rh/MgAl$_2$O$_4$ catalyst: CH$_4$ and CO$_2$ conversion; and H$_2$/CO ratio obtained at 800° C., 1 bara and GHSV=73,000 h$^{-1}$. Gas mixture containing 45% CH$_4$+45% CO$_2$+10% Ar was used as feed.

All three catalysts showed very good activity over a period of 150 hours (see FIGS. 4, 5, and 6). In the case of 10% Ni/MgAl$_2$O$_4$ (FIG. 4) and 7.5% Ni+2.5% Pt/MgAl$_2$O$_4$ (FIG. 5) the H$_2$/CO ratio obtained was ≈0.75, whilst in the case of 7.5% Ni+2.5%16/MgAl$_2$O$_4$ (FIG. 6) it was ≈0.94. This is because of reverse water gas shift reaction (CO$_2$+H$_2$=CO+H$_2$O). The reverse water gas shift reaction is dependent on methane and CO$_2$ conversion, at higher conversion shift reaction reaches equilibrium giving higher H$_2$/CO ratio. So, H$_2$/CO ratio is not catalyst specific. The H$_2$/CO ratio near to 1 can be obtained by increasing the CH$_4$ and CO$_2$ conversion by decreasing the GHSV, h$^{-1}$ of the catalytic reaction.

The invention claimed is:

1. A hydrocarbon gas reforming supported catalyst comprising:
   (a) a catalytic material capable of catalyzing the production of a gaseous mixture comprising hydrogen and carbon monoxide from a hydrocarbon gas; and
   (b) a support material comprising an alkaline earth metal/metal oxide compound having a structure of D-E, wherein
   D is a M$_1$ or M$_1$M$_2$, M$_1$ and M$_2$ each individually being an alkaline earth metal selected from the group consisting of Mg, Ca, Ba, and Sr, and
   E is a metal oxide selected from the group consisting of Al$_2$O$_3$, SiO$_2$, ZrO$_2$, TiO$_2$, and CeO$_2$,
   wherein the catalytic material is chemically bonded to the support material, and wherein the chemical bond is a M1-O bond, where M1 is a metal from the catalyst and oxygen (O) is from the alkaline earth metal/metal oxide compound from the support material.

2. The hydrocarbon gas reforming supported catalyst of claim 1, wherein D is M$_1$ and E is Al$_2$O$_3$.

3. The hydrocarbon gas reforming supported catalyst of claim 2, wherein the compound is MgAl$_2$O$_4$, CaAl$_2$O$_4$, BaAl$_2$O$_4$, or SrAl$_2$O$_4$.

4. The hydrocarbon gas reforming supported catalyst of claim 3, wherein the compound is MgAl$_2$O$_4$.

5. The hydrocarbon gas reforming supported catalyst of claim 1, wherein D is M$_1$M$_2$ and E is Al$_2$O$_3$.

6. The hydrocarbon gas reforming supported catalyst of claim 5, wherein M$_1$M$_2$ is MgCa, MgBa, MgSr, BaCa, BaSr, or CaSr.

7. The hydrocarbon gas reforming supported catalyst of claim 1, wherein the supported catalyst comprises at least 1% or more by weight of the catalytic material.

8. The hydrocarbon gas reforming supported catalyst of claim 7, wherein the supported catalyst comprises at least 80% or more by weight of the support material.

9. The hydrocarbon gas reforming supported catalyst of claim 8, wherein the supported catalyst comprises 5% to 50% by weight of the catalytic material and 95% to 50% by weight of the support material.

10. The hydrocarbon gas reforming supported catalyst of claim 1, wherein the support material is in particulate or powdered form.

11. The hydrocarbon gas reforming supported catalyst of claim 10, wherein the particle size of the support material ranges from 5 to 300 μm.

12. The hydrocarbon gas reforming supported catalyst of claim 1, wherein the support material is in non-powdered form or has a fabricated geometry.

13. The hydrocarbon gas reforming supported catalyst of claim 12, wherein the fabricated geometry is a pellet, foam, honeycomb, or monolith.

14. The hydrocarbon gas reforming supported catalyst of claim 1, wherein the catalytic material is a metal catalyst or a metal oxide catalyst.

15. The hydrocarbon gas reforming supported catalyst of claim 14, wherein the metal catalyst or metal oxide catalyst comprises Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof.

16. The hydrocarbon gas reforming supported catalyst of claim 15, wherein the metal catalyst comprises Ni, Pt, Rh, or Ru or any combination thereof.

17. The hydrocarbon gas reforming supported catalyst of claim 15, wherein the catalyst comprises Ni and Pt and the catalyst has the following formula: 7.5 wt. % Ni/2.5 wt. % Pt/MgAl$_2$O$_4$.

18. The hydrocarbon gas reforming supported catalyst of claim 15, wherein the catalyst comprises Ni and Rh and the catalyst has the following formula: 7.5 wt. % Ni/2.5 wt. % Rh/MgAl$_2$O$_4$.

19. The hydrocarbon gas reforming supported catalyst of claim 1, wherein the catalytic material comprises La and Ni and the support material comprises MgAl$_2$O$_4$.

20. The hydrocarbon gas reforming supported catalyst of claim 19, wherein the catalyst has the following formula: 11.5 wt. % La/4.8 wt. % Ni/MgAl$_2$O$_4$.

21. The hydrocarbon gas reforming supported catalyst of claim 1, wherein the catalytic material is dispersed on the surface of the support material.

22. The hydrocarbon gas reforming supported catalyst of claim 1, wherein the supported catalyst is capable of reducing carbon formation on the surface of said supported catalyst when subjected to temperatures at a range of greater than 700° C. to 1100° C.

23. The hydrocarbon gas reforming supported catalyst of claim 1, wherein the supported catalyst is capable of reducing sintering of the catalytic material or of the support material when subjected to temperatures at a range of greater than 700° C. to 1100° C.

24. The hydrocarbon gas reforming supported catalyst of claim 1, wherein the catalytic material comprises a pyrochlore of:

$$A_xB_{y-z}C_zO_7$$

wherein, A is a trivalent ion of an element of La, Ce, Nd, Bi, Sc, or Y, where 0≤x≤2, B is a tetravalent ion of an element of Zr, Pt, Pd, Ni, Mo, Rh, Ru, or Ir, where 0≤y-z≤2, C is a bivalent, trivalent or tetravalent ion of Ba, Ca, Cu, Mg, Ru, Rh, Pt, Pd, Ni, Co, or Mo, where 0≤z≤2.

25. The hydrocarbon gas reforming supported catalyst of claim 1, wherein the catalytic material comprises La$_2$Ni$_{0.11}$Zr$_{1.89}$O$_7$ and the support material comprises MgAl$_2$O$_4$.

26. The hydrocarbon gas reforming supported catalyst of claim 1, wherein the hydrocarbon gas is methane.

27. The hydrocarbon gas reforming supported catalyst of claim 1, wherein the catalyst is not Ni/MgAl$_2$O$_4$.

28. A method of producing the hydrocarbon gas reforming supported catalyst of claim 1 comprising:
obtaining a compositions comprising
(a) a continuous phase comprising a solvent and a catalytic material capable of catalyzing the production of a gaseous mixture comprising hydrogen and carbon monoxide from a hydrocarbon gas, wherein the catalytic material is solubilized in the solvent; and
(b) a dispersed phase comprising an alkaline earth metal/metal oxide compound in powdered or particulate form, said compound having a structure of D-E, wherein
D is a M$_1$ or M$_1$M$_2$, M$_1$ and M$_2$ each individually being an alkaline earth metal selected from the group consisting of Mg, Ca, Ba, and Sr, and
E is a metal oxide selected from the group consisting of Al$_2$O$_4$, SiO$_2$, ZrO$_2$, TiO$_2$, and CeO$_2$; and
evaporating the solvent from said composition, wherein the hydrocarbon gas reforming supported catalyst is produced, and wherein the catalytic material is chemically bonded to the support material, and wherein the chemical bond is a M1-O bond, where M1 is a metal from the catalyst and oxygen (O) is from the alkaline earth metal/metal oxide compound from the support material.

29. A method of catalytically reforming a reactant gas mixture comprising:
(a) providing a reactant gas mixture comprising a hydrocarbon and an oxidant;
(b) providing the hydrocarbon gas reforming supported catalyst of claim 1; and
(c) contacting the reactant gas mixture with the hydrocarbon gas reforming supported catalyst under conditions sufficient to produce a gaseous mixture comprising carbon monoxide and hydrogen.

30. The method of claim 29, wherein the hydrocarbon comprises methane and the oxidant comprises carbon dioxide or a mixture of carbon dioxide and oxygen.

31. The method of claim 30, wherein the ratio of carbon monoxide to hydrogen in the produced gaseous mixture is approximately 1.

32. The method of claim 31, wherein the hydrocarbon comprises methane and the oxidant comprises water.

33. The method of claim 32, wherein the water is water vapor.

34. The method of claim 33, wherein the ratio of carbon monoxide to hydrogen in the produced gaseous mixture is approximately 0.33.

35. The method of claim 29, further comprising contacting the reactant gas mixture with the hydrocarbon gas reforming supported catalyst at a temperature ranging from 700° C. to 1100° C., at a pressure ranging from 1 bara to 30 bara, and at a gas hourly space velocity (GHSV) ranging from 500 to 10000 h$^{-1}$.

* * * * *

UNITED STATES PATENT AND TRADEMARK OFFICE
CERTIFICATE OF CORRECTION

| | | |
|---|---|---|
| PATENT NO. | : 9,616,414 B2 | Page 1 of 1 |
| APPLICATION NO. | : 14/273256 | |
| DATED | : April 11, 2017 | |
| INVENTOR(S) | : D'Souza et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 57 days.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*